United States Patent [19]

Schoenmakers

[11] Patent Number: 4,926,278
[45] Date of Patent: May 15, 1990

[54] MAGNETIC TAPE CASSETTE APPARATUS HAVING REDUCED AZIMUTH ERROR

[75] Inventor: Johannes J. M. Schoenmakers, Eindhoven, Netherlands

[73] Assignee: U.S. Philips Corporation, New York, N.Y.

[21] Appl. No.: 302,078

[22] Filed: Jan. 23, 1989

Related U.S. Application Data

[63] Continuation of Ser. No. 558,069, Dec. 5, 1983, abandoned, which is a continuation-in-part of Ser. No. 537,893, Sep. 30, 1983, abandoned.

[30] Foreign Application Priority Data

Feb. 28, 1983 [NL] Netherlands ............... 8300730

[51] Int. Cl.$^5$ ............................................. G11B 15/60
[52] U.S. Cl. ............................. 360/130.21; 360/129
[58] Field of Search ................... 360/130.20–130.23, 360/104, 106, 109, 129; 242/197, 199

[56] References Cited

U.S. PATENT DOCUMENTS

| | | | |
|---|---|---|---|
| 2,916,228 | 12/1959 | Wellington | 242/76 |
| 3,155,359 | 11/1964 | Hogan et al. | 248/288 |
| 3,440,359 | 4/1969 | Page et al. | 179/100.2 |
| 3,521,009 | 7/1970 | Auld | 179/100.2 |
| 3,812,536 | 5/1974 | Linke | 360/122 |
| 3,855,628 | 12/1974 | Bachmann | 360/106 |
| 3,869,725 | 3/1975 | Datillo | 360/130 |
| 3,882,543 | 5/1975 | Richards | 360/109 |
| 4,375,071 | 2/1983 | Crowley et al. | 360/104 |
| 4,441,133 | 4/1984 | Ogawa et al. | 360/130.22 |
| 4,485,420 | 11/1984 | Schoenmakers | 360/130.21 |

FOREIGN PATENT DOCUMENTS 56-54669  5/1981  Japan .

OTHER PUBLICATIONS

"Reliable, Low Cost Cassette Transport Uses Molded Plastic Parts", Computer Design, vol. 16, No. 3, Mar. 1977.

Primary Examiner—John H. Wolff
Attorney, Agent, or Firm—David R. Treacy

[57] ABSTRACT

A magnetic-tape-cassette apparatus having a magnetic head fixed in a head mount and carried on a head mounting plate. The head mount includes a cylindrical tape guide disposed to each side of the magnetic head air gap, in the direction of tape travel, a height limiter at one axial end of each guide surface, and an obliquely disposed control surface at the other end of each guide surface for biasing magnetic tape against the height limiters, so that the magnetic tape always has a constant orientation with respect to the air gap.

22 Claims, 5 Drawing Sheets

MAGNETIC TAPE CASSETTE APPARATUS HAVING REDUCED AZIMUTH ERROR

This is a continuation of application Ser. No. 5,580,699 filed Dec. 5, 1983, abandoned, which is a continuation-in-part of 537,893 filed Sept. 30, 1983, abandoned.

RELATED INVENTION

This invention is an improvement over the invention disclosed and claimed in my co-pending U.S. patent application Ser. No. 367,314 filed Apr. 12, 1982.

BACKGROUND OF THE INVENTION

The invention relates to a magnetic-tape-cassette apparatus having a magnetic head with a cylindrical curved head face, which is used for recording and/or playback of information having a significant relatively high frequency content. More particularly, the invention concerns such apparatus having a magnetic head unit which includes guides and height limiters especially arranged one to each side of the air gap to minimize azimuth error, so as to maximize high frequency response.

My co-pending application, referred to above and expressly incorporated herein by reference, discloses a magnetic head unit having guide surfaces which are cylindrically curved about axes generally parallel to the axis of the cylindrical head face, a tape height limiter arranged at an axial end of each guide for limiting movement of the tape laterally in the direction of the height limiter, and a control means for keeping a lateral edge of the tape in contact with the height limiters during tape transport. The two height limiters are so arranged relative to the magnetic head, that a line connecting the points where the guide surfaces adjoin the height limiters extends perpendicularly to a plane which extends through the air gap or gaps, which plane is situated at equal distances from the adjacent pole pieces of the magnetic head.

The apparatus disclosed in my co-pending application reduces aximuth errors, that is, errors which occur because the position of the air gap deviates from a perfectly perpendicular position relative to the lateral edge of the magnetic tape, to a level so low that they have little or no undesired effect. This is accomplished by maintaining the connecting line between the above described points of the height limiters exactly perpendicular to the relevant plane through the head air gap. This construction provides the advantage that no further adjustment of the head unit is necessary during manufacture of the apparatus. Another advantage is that the transverse position of the track on the magnetic tape, relative to the air gap, is maintained accurately during tape transport. This construction thus enables magnetic tape cassettes recorded on one magnetic tape cassette apparatus to be played back on another apparatus without reproduction errors. To maintain the edge of the tape with the height limiters, my co-pending application discloses a control means comprising two plate springs which are each situated at an axial end of an associated tape guide and are each biased against the axial end of the relevant tape guide by a spring. This arrangement requires that the spring constant and the location of the plate springs must be chosen carefully to ensure that the tape guiding assembly provides the desired effect.

SUMMARY OF THE INVENTION

The object of the invention is to construct a magnetic tape cassette apparatus of the type described above, such that accurate guidance of the magnetic tape along the magnetic head unit is obtained without special tolerances or adjustment during manufacture of the apparatus, and that this accurate guidance is maintained reliable for a long period of time.

In accordance with the invention, the control means for biasing a lateral edge of the tape against the height limiters is formed by obliquely disposed control surfaces which adjoin the respective guide surfaces, the distance from the control surface of each guide to the respective height limiter decreasing in a direction toward the guide surface; and the control surfaces, guide surfaces and height limiters form an integral unit with the head mount.

Perferably, the control surfaces are formed by cylindrical or conical surfaces arranged so that the angle between tangential planes to the guide surface and the control surface is between approximately 40° and 60°, and the control surface has a radius relative to the radius of the guiding surface substantially satisfying the equation $$S = r/\cos \alpha,$$

where S is the control surface radius, r is the guide surface radius, and $\alpha$ is the angle between the guide surface and control surface. As a result of this construction the intersecting line of the guiding surface and the control surface is located in a plane which extends substantially perpendicular to the guide surface and contact between the tape edge and the control surfaces is optimized.

The construction according to the invention enables the head mount to be manufactured as one piece, so that no lateral adjustments of any part of the head mount are necessary. The only adjustment required is that of the perpendicular position of the air gap of the magnetic head relative to the connecting line between the height limiters. After positioning of the magnetic head with the air gap at the perpendicular position during assembly, the adjustment can be maintained permanently by applying a fixing material, for example a glue, between the walls of the magnetic head and the head mount. This construction not only offers the possibility of eliminating azimuth errors of the magnetic head unit with a completely passive arrangement, but also enables positioning of the magnetic head on a magnetic tape cassette apparatus with minimal effort and at a price which is competitive with conventional techniques.

In operation, if a tape edge tends to come clear of either of the height limiters, the obliquely disposed control surfaces immediately correct its position, thereby insuring constant contact with the height limiters. This requires only a minimal force, so that curling of the tape edge as a result of the pressure with which it is urged against the height limiters is precluded.

Preferably each guide surface has an axial dimension, from the height limiter to the intersection of the control surface with the guide surface, which has a maximum value equal to the minimum width of the magnetic tape. As a result of this dimensioning, the corrective effect of the control surfaces on the magnetic tape is always obtained, but when a magnetic tape has a width greater than the minimum width, the control surfaces exert only a small force directed toward the height limiters in addition to that required for the corrective effect on the magnetic tape.

According to another aspect of the invention, the head mount has side walls which are upright relative to the head mounting plate of the apparatus, and comprise centering edges on the wall sides which face each other, these centering edges extending substantially perpendicularly relative to a tangent plane to the head face at the air gap, and being situated at a distance from each other which is smaller than that between other portions of these side walls. Because the need to adjust the head relative to the head mount makes it desirable that the distance between the inner sides of the upright side walls be slightly greater than the width of the magnetic head, to prevent outward deflection of the upright side walls during adjustment, the presence of these centering edges permits head adjustment against a slight friction between the head and the mount, so that adjustment and assembly are facilitated. Still more preferably, the head mount surrounds the magnetic head on all four sides as viewed perpendicular to a tangent plane to the head face at the air gap. Despite small external dimensions, such a head mount is sufficiently rigid to ensure that, once adjusted, the head retains the correct position within the head mount.

According to still another aspect of the invention, the head mount includes fixing means arranged to cooperate with clamping means on the head mounting plate, for fixing the head mount on the apparatus. This simplifies the problem of assuring that the magnetic head unit occupies the correct position on the head mounting plate. Further, the air gap can be adjusted relative to the track on the tape while maintaining correct adjustment of the air gap relative to the tape guides, by arranging the head mount to be rotatable relative to the head mounting plate; a range of rotation of 180° may be defined by two stops, for scanning upper or lower tracks on a tape.

According to yet another embodiment of the invention, near the head face at least one wall of the magnetic head, extending substantially parallel to the head mounting plate, comprises a wall portion which is located at a smaller distance from the air gap, and a base portion of the head mount is positioned partly against that wall portion. This enables adapting a magnetic tape cassette apparatus, having customary magnetic head positioning means, to the system in accordance with the invention without basically modifying the apparatus construction. It then becomes possible to make the wall portion reentrant relative to the remainder of the side wall, for example by grinding, so that after the head mount has been fitted the overall height of the magnetic head unit is hardly changed. This may be important in the existing apparatus which have generally limited space around the magnetic head.

According to yet another embodiment of the invention, the head mount is a unitary molding made from a plastic material and, at least at the location of the tape guides, is covered with a wear-resistant layer. This enables the critical parts of the head mount, such as the control surfaces, the guide surfaces and the height limiters, to be formed accurately yet simply; and by providing a wear-resistant layer the control surfaces retain their corrective effect on tape edge position even after a long period of use.

Various embodiments of the invention in magnetic-tape-cassette apparatus will be described in more detail with reference to the drawings.

DESCRIPTION OF THE PREFERRED EMBODIMENTS

Figure 1:
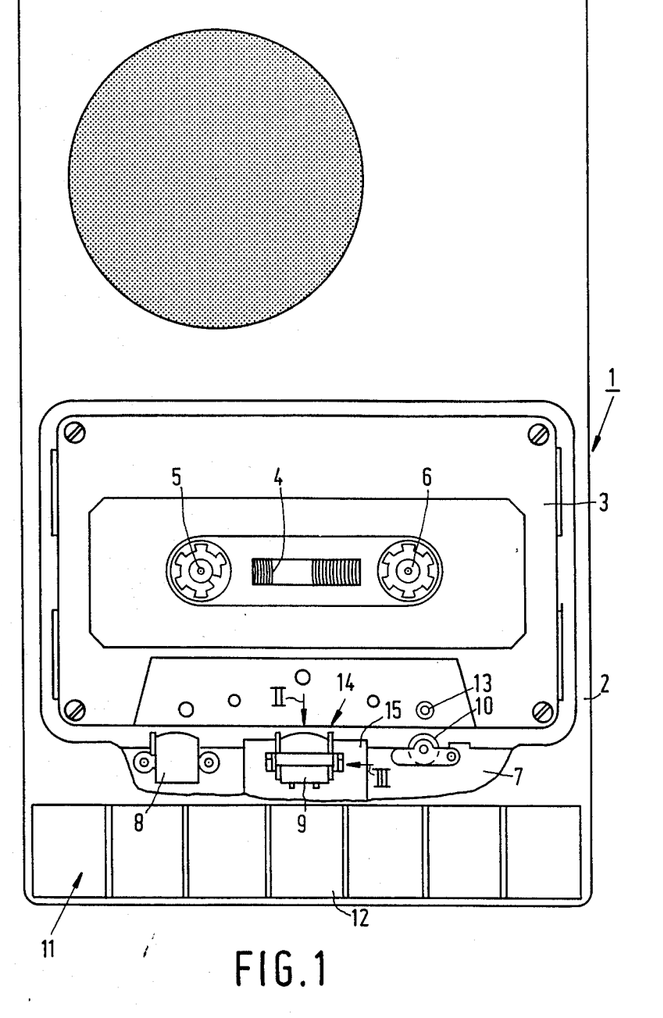
FIG. 1 is a plan view of a magnetic-tape-cassette apparatus in accordance with the invention, a part of the apparatus housing being cut away to show the parts which are relevant to the invention.

The magnetic-tape-cassette apparatus shown in FIG. 1 comprises a housing 2 into which a magnetic tape cassette 3 can be inserted. The magnetic tape cassette contains a length of magnetic tape 4 which is wound around two hubs, not shown. During operation the hubs are coupled to winding mandrels 5 and 6 of the apparatus 1.

The apparatus 1 further comprises a head mounting plate 7 which is guided inside the housing 2 and which carries a magnetic erase head 8, a combined recording/playback head 9 and a pressure roller 10. The apparatus 1 is also provided with a number of control buttons 11, including a playback button 12. Depression of the button 12 causes the head mounting plate 7 to be moved towards the cassette 3, the magnetic heads 8 and 9 at least partly penetrating the cassette through front openings, not shown, so that that the magnetic tape 4 is positioned against the heads 8 and 9.

The apparatus 1 further comprises a capstan 13, which rotates when the button 12 is depressed, the tape transport along the magnetic heads then being started because the pressure roller 10 has been moved towards the capstan 13.

The magnetic head 9, which forms part of a magnetic head unit 14, is mounted on a plate portion 15 of the head mounting plate 7. As is shown in more detail in FIGS. 2, 3 and 4 the magnetic head unit 14 comprises a head mount 16, which is preferably made of a plastic material. In this way the various parts of the head mount 16 can be manufactured accurately and can occupy a correct position relative to each other. The head mount 16 comprises a base portion 17 which has a recess 18 near one edge, which recess in the assembled condition of the head unit 14 cooperates with a support 19 on the plate portion 15. Thus the penetration depth of the magnetic head in the direction of the magnetic tape cassette 3 is defined. The plate portion 15 further carries two supports 20 and 21, which in the assembled condition of the magnetic head unit 14 are each situated on the tape side of the head mount and are positioned against the underside of mounting portions 22 and 23 on the head mount which face the plate portion 15. Thus, the magnetic head unit 14 is positioned relative to the head mounting plate 7 by means of three contact points. For effectively retaining the magnetic head unit in this position two elastic hooks 24 and 25 are provided on the plate portion 15, which hooks snap over the tops of the mounting portions 22 and 23. It is to be noted that the side walls of the head mount 16 above the portions 22 and 23 are provided with another pair of edge portions 26 and 27. These edge portions may be required if, for example, owing to lack of space within the housing 2 the base portion 17 is situated at a short distance from the head mounting plate 7, so that the length of the hooks 24 and 25 would not be sufficient to cooperate with the portions 22 and 23. As shown in the view of FIG. 3, the hooks 22 and 23 are situated in the space between the pairs of supports 20 and 21 and the support 19. Moreover, as the hooks 24 and 25 are comparatively wide the position of the head mount relative to the head mounting plate 7 is defined in a stable manner in the snapped-in position, yet the head mount can be replaced simply.

The head mount 16 carries the magnetic head 9, which has a curved head face 28 in which air gaps 29 terminate in the lower part. In the customary manner the air gaps are formed by the spaces between adjacent polepieces, not shown, of the magnetic head. The head face 28, as is shown in FIG. 1, is curved cylindrically and at least near the air gaps 29 it forms a guiding surface of the magnetic head 9 for the magnetic tape 4. The magnetic head 9 comprises a plurality of contacts 30 at its front side (that is, remote from the head face 28) via which contacts the magnetic head is electrically connected to other parts of the apparatus. The base portion 17 of the head mount 16 comprises a locating edge 31 at the side which faces the magnetic head 9, which edge constitutes a sort of knife-edge bearing for the adjustment of the magnetic head 9. In this respect it is important that the locating edge has its maximum height substantially at the midpoint between the upright side walls of the head mount 16. At the facing sides of the side walls the head mount also comprises centering edges 32 and 33, which similarly to the locating edge 31 extend substantially perpendicularly to a tangent plane to the head face 28 at the location of the air gaps 29. The centering edges 32 and 33 are situated at a smaller distance from each other than the other portions of the upright sides of the head mount 16. Preferably, the presence of the centering edges 32 and 33 produces some friction when the magnetic head is pivoted about the locating edge 31.

Figure 2:
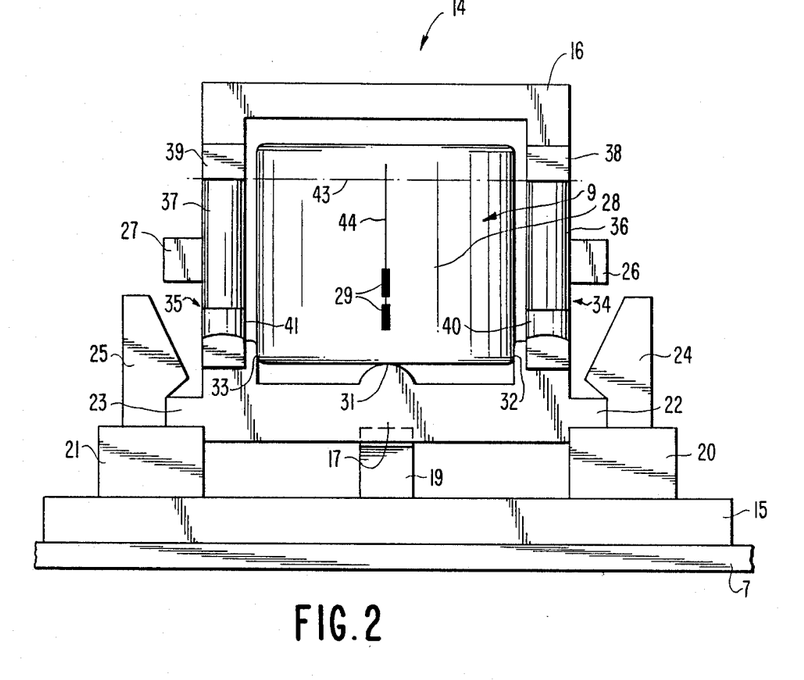
FIG. 2 is a view of the head unit and mounting plate on an enlarged scale in the direction of the arrow II in FIG. 1.
Figures 3, 4, 5, 6:
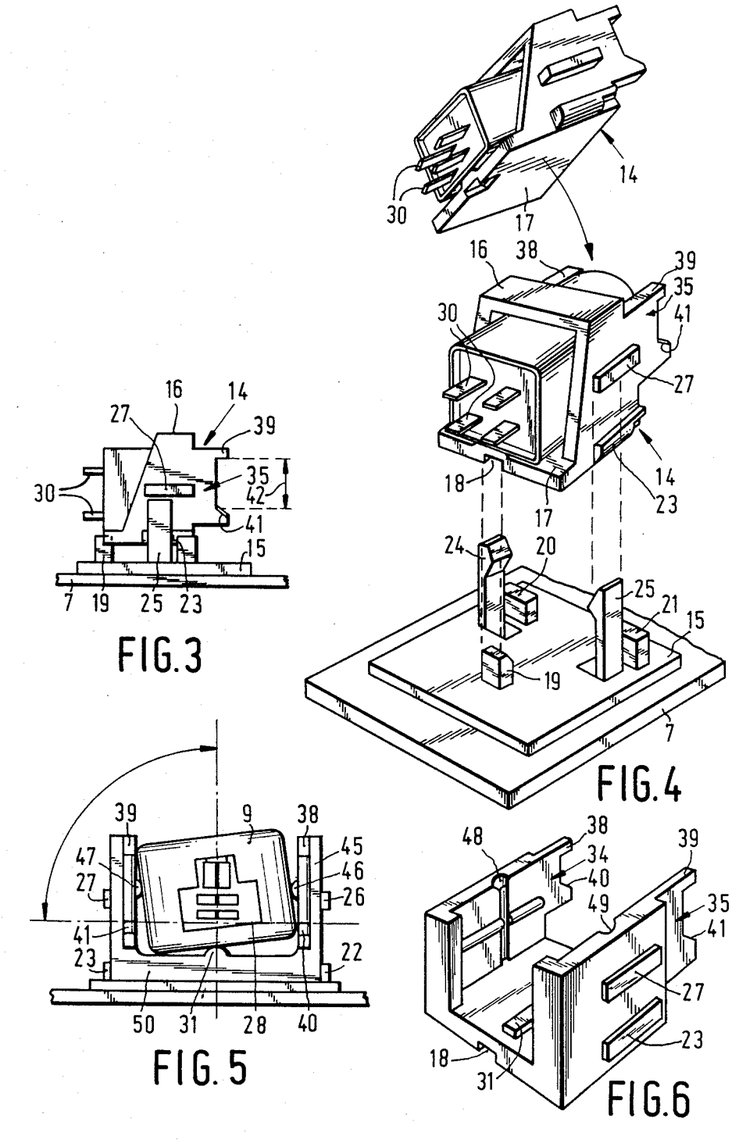
FIG. 3 is a view of the head unit and mounting plate on an enlarged scale taken on the arrow III in FIG. 1.
FIG. 4 is an exploded view on an enlarged scale of the magnetic head unit and head mounting plate of the apparatus of FIG. 1.
FIG. 5 is a view, similar to FIG. 2, of a magnetic head unit of a magnetic-tape-cassette apparatus in a second embodiment.
FIG. 6 is a perspective view of the head mount of the head unit for the embodiment shown in FIG. 5.
Figure 3A:
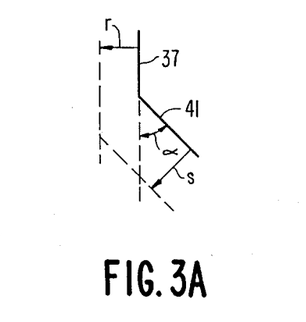
FIG. 3a is a diagrammatic view at an enlarged scale showing the angle between the guide surface and the control edge.

In the view of FIG. 2 the head mount 16 surrounds the magnetic head 9 on all four sides. This ensures that the head mount has a great rigidity despite the fact that it is made of a plastic material. In line with the upright side walls the head mount 16 carries tape guides 34 and 35, one to each side of the air gaps 29 as viewed in the direction of tape transport, which guides have cylindrically curved guide surfaces 36 and 37 respectively. The guide surfaces 36 and 37 each adjoin a height limiter 38 and 39 respectively at the axial ends of the guide surfaces, which height limiters are constructed as projecting lugs. Preferably, the undersides of the height limiters, which cooperate with the tape edge, extend perpendicular to a plane tangent to the head face at the location of the air gaps 29. The other axial ends of the guide surfaces 36 and 37 adjoin control means formed as control surfaces 40 and 41 respectively, formed by upwardly inclined walls of projecting lugs. For each tape guide the distance from the control surface to the associated height limiter decreases in a direction toward the guide surfaces, see FIG. 3. The angle between the control surface and a plane tangent to the guide surface is approximately 40° to 60°. The axial dimension of each guide surface from the control surface intersection to the height limiter, indicated by the reference numeral 42 in FIG. 3, is at the most equal to the minimum width dimensions of a magnetic tape 4 which is moved along the magnetic head 9. An optimal edge portion, which extends parallel to the respective height limiters 38 or 39 may adjoin the lower side of the respective control surface 41 or 42, the distance between the edge portion and the height limiter being at least equal to the maximum tape-width dimension.

The arrangements of the guide surfaces 34, 35 and control surfaces 40, 41 are preferably determined in accordance with the following principles. The guide surfaces 36, 37 should be cylindrical surfaces, the cylinder axes being parallel to a plane through the head gaps 29; and as will be described more fully below, should be parallel or nearly parallel to a plane tangent to the head at the location of the gaps. However, the surface need not be circular cylindrical but may be any other smoothly rounded surface. The shape of the control surfaces 40, 41 is then selected with respect to that of the guiding surfaces 36, 37 such that the intersecting line of the guide surface and the control surface lies in a plane perpendicular to the axis of the guide surface. The control surface 40, 41 may be either cylindrical or conical or any other smoothly rounded surface; for the circumstance of circular cylindrical guide and control surfaces, where S equals the radius of the control surface, r is the radius of the guide surface, and $\alpha$ is the angle between planes tangent to the guide surface and the control surface, the radius S is substantially satisfying the equation:

$$S = r/\cos \alpha.$$

The head mount 16 can be made of a plastic material which is nickel-plated and covered with a wear-resistant layer, at least at the location of the tape guides 34 and 35. For this purpose, for example, the material rhodium may be used, which is found to have suitable wear-resistance properties. The head mount may be made from a high-grade synthetic material having a high resistance to wear, a high dimensional stability and a low coefficient of friction, in which case plating is not necessary. An example of such a material is carbon-whiskers reinforced nylon. After the magnetic head 9 has been fitted in the head mount 16 the head is pivotally adjusted about the knife-edge 31, which is preferably effected in a special alignment jig when the head unit 14 has not yet been mounted on the apparatus, so that a connecting line 43 (see FIG. 2) between points where the guide surfaces 36 and 37 adjoin the height limiters 38 and 39 respectively is directed perpendicularly to a plane 44 through the air gaps 29, which plane is situated at equal distances from the adjacent pole-pieces. After this adjustment has been completed, which is facilitated by the presence of the centering edges 32 and 33, the magnetic head 9 is permanently secured in the correct position relative to the mount by a suitable fixing material such as a glue. For this purpose glue is applied in the spaces between the magnetic head and the upright side walls of the head mount. After the adjustment the magnetic head unit 14 is ready for mounting in the apparatus. The presence of the fixing means in the form of the mounting portions 22 and 23, and the clamping means in the form of the elastic hooks 24 and 25, greatly simplifies the mounting of the magnetic head unit 14. The advantage of this mounting method is that replacing the magnetic head is also a simple operation, so that the costs of replacing a magnetic head are reduced.

It has been found that the control, surfaces 40 and 41 should preferably be located near the lower side of the magnetic head because the air gaps 29 are also situated in the lower part of the head face 28 and in this way the tracks on the magnetic tape, in particular the lower track, are defined in the most accurate manner. Moreover, it has been found that many magnetic-tape-cassette apparatus comprise capstans which do not extend perfectly perpendicularly to the head mounting plate and tend to move the magnetic tape downwards relative to the magnetic head. However, the control surfaces and the height limiters may alternatively be arranged the other way around, so that the control surfaces are situated at the upper side of the magnetic head and the height limiters at the lower side. Either arrangement also provides an accurate azimuth position of the magnetic head relative to the tape which moves along this head.

The supports 19, 20 and 21 and the elastic hooks 24 and 25 can be formed on a metal head mounting plate 7 by outsert-molding. However, in the case of tape decks having a plastic head mounting plate 7, the supports and hooks may be molded integrally with the head mounting plate, so that a very small mounting height is obtained.

In the embodiment shown in FIGS. 5 and 6 a head mount 45 is used which comprises mounting portions 22, 23 and 26, 27 on the outer sides of the upright side walls. Further corresponding parts of the head mount bear corresponding reference numerals. On the facing inner walls of the upright side walls two centering portions 46 and 47 respectively are provided, which exert some friction on the magnetic head during the adjustment. As is shown in FIG. 5 the centering edges 46 and 47 may alternatively be arranged at some distance from a base portion 50 of the head mount 45. Moreover, ducts 48 and 49 are formed in the side walls, which ducts are slightly widened at the upper side of the head mount and which serve to facilitate the application of the fixing agent, such as a glue, after the adjustment of the magnetic head. Again it will be evident that the upright side walls should leave enough clearance relative to the magnetic head for the adjustment of this head. This is even more important if, as in the present embodiment, use is made of a U-shaped head mount 45, in which case the upright side walls would be bent if the clearance is inadequate, which bending is undesirable.

Figure 7:
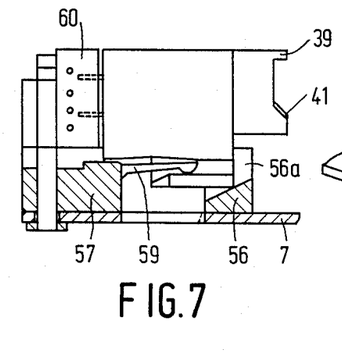
FIG. 7 similar view to that of FIG. 3 of a magnetic head unit and a head mounting plate in a third embodiment of a magnetic-tape-cassette apparatus.
Figure 8:
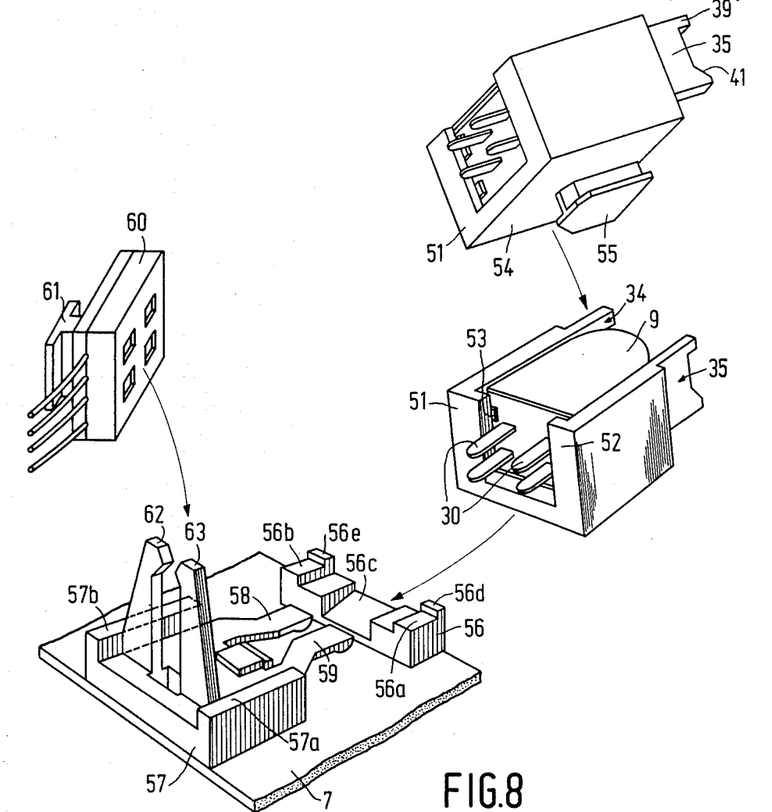
FIG 8 is an exploded view showing parts of the magnetic-tape-cassette apparatus in the embodiment shown in FIG. 7.

A third embodiment of a magnetic head unit for a magnetic-tape-cassette apparatus is shown in FIGS. 7 and 8, a U-shaped magnetic head mount 51 carrying the magnetic head 9. The head mount 51 comprises parts which are constructed in the same way as in the first embodiment and which bear the same reference numerals. It is to be noted that, as is shown in FIG. 7, the guide surfaces 36 and 37 of the tape guides 34 and 35 respectively may be arranged at a small acute angle of, for example, 2 to 3 degrees relative to a tangent plane to the head face 28 at the location of the air gaps 29. This has the advantage that if the control surfaces have worn after prolonged use the magnetic tape will still move along the guide surfaces 36 and 37 in a position substantially parallel to the tangent plane to the head face.

At the front (the side remote from the head face 28) the head mount 51 comprises stop portions 52 and 53, which define the position of the magnetic head perpendicular to a plane tangent to the head face. These stop portions further simplify the adjustment of the magnetic head 9 in the mount 51. The head mount 51 comprises a T-shaped projection 55 at the lower side of the base portion 54, which projection forms a means for securing the head mount to the head mounting plate. For this purpose the head mounting plate 7 is provided with two supporting members 56 and 57. At their tops, remote from the head mounting plate 7, the supporting members 56 and 57 comprise supports 56a, 56b and 57a, 57b, on which the base portion 54 bears in the mounted position. Furthermore, the supporting member 57 is provided with two elastic hooks 58 and 59 which in the mounted condition of the magnetic head unit cooperate as clamping means with the projection 55. An oblique supporting surface 56c of the supporting member 56 and the action of the resilient hooks 58 and 59 ensure that the magnetic head unit is correctly positioned relative to the head mounting plate 7 once it has been mounted. In this respect it is also important that the supporting member 56 comprises raised edges 56d and 56e, which define the position of the magnetic head unit in a direction perpendicular to the plane tangent to the head face. For electrical connection of the magnetic head 9 a terminal block 60 with a projection 61 can be clamped between resilient limbs 62 and 63 which are connected to the head mounting plate 7. It is to be noted that on the inner side the head mount 51 is provided, in a manner not shown, with centering edges and a knife-edge bearing, in the same way as in the preceding embodiments, to facilitate the adjustment of the magnetic head 9. By making the head mount 51 and the supports 56 and 57 and the terminal block 60 of a plastic material a magnetic head unit is obtained which in cooperation with parts on the head mounting plate 7 can be mounted on the head mounting plate 7 in a cheap yet accurate manner. It is to be noted that the use of a terminal block 60 for the electrical contact 30 is also possible in the preceding embodiments, in which case elastic limbs similar to the limbs 62 and 63 must be provided on the head mounting plate 7.

Figure 9:
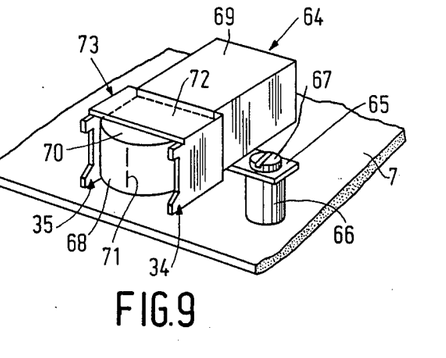
FIG. 9 is a view of a magnetic head unit with head mounting plate in a fourth embodiment of a magnetic-tape-cassette apparatus in accordance with the invention.
Figure 10:
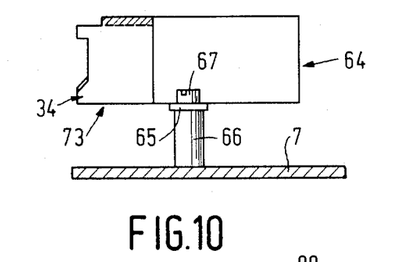
FIG. 10 is a side view of the magnetic head unit as shown in FIG. 9.

In the embodiment of a magnetic-tape-cassette apparatus provided with a magnetic head unit as shown in FIGS. 9 and 10, a magnetic head fixture of a conventional type is used. A magnetic head 64 is mounted on a support 65, whose height position relative to the head mounting plate 7 is defined by spacers 66 and which is secured by means of bolts 67. The magnetic head 64 has a top wall 69 which extends substantially parallel to the head mounting plate and which has a wall portion 70 which is situated near the head face 68. The portion 70, for example as a result of grinding, is disposed at a smaller distance from the air gaps 71 than the remainder of the top wall 69. This provides room for a base portion 72 of a head mount 73, the base portion at least partly engaging the wall portion 70 in the mounted position of the head mount 73. In this embodiment the head mount 73 is U-shaped and at the rear (the head face side), it comprises tape guides 34 and 35 similar to those in the first embodiment. The adjustment of the head mount 73 is effected in the same way as in the preceding embodiments, which can be facilitated by providing the head mount 73 also with centering edges and a knife-edge. A basic difference is that the head mount 73 in the present embodiment only provides positioning of the magnetic tape relative to the air gaps 71, ensuring that the tracks are located at the correct height and keeping the azimuth position of the magnetic tracks perpendicular to a plane through the air gaps 71, but without any provision for mounting to the apparatus plate. The head mount 73 has the advantage that the overall height measured perpendicularly to the head mounting plate 7 of the magnetic head 64 does not increase, so that the magnetic head unit with the magnetic head 64 and the mount 73 can be used in existing construction without any problems.

Figure 11:
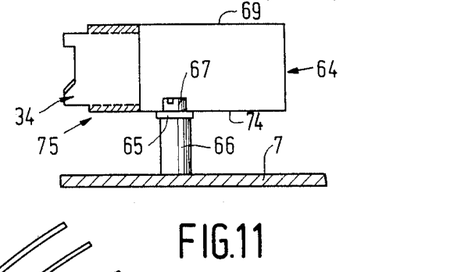
FIG. 11 is a view, partly in cross-section, of a magnetic head unit of a magnetic-tape-cassette apparatus in a fifth embodiment.

FIG. 11 shows a modification to the preceding embodiments, the magnetic head 64 having a ground-away portion not only near a top wall 69 but also near an opposite bottom wall 74. In the same way as in the embodiment of FIGS. 2-4, this enables a head mount 75 to be slid over the magnetic head 64, which head mount surrounds the magnetic head at four sides. The advantage is that this arrangement permits a more rigid construction of the head mount.

Figure 12:
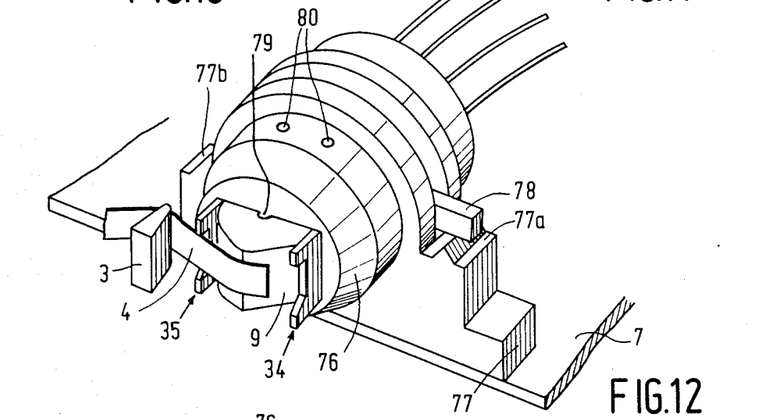
FIG. 12 is a perspective view of a magnetic head unit of a sixth embodiment of a magnetic-tape-cassette apparatus in accordance with the invention.
Figure 13:
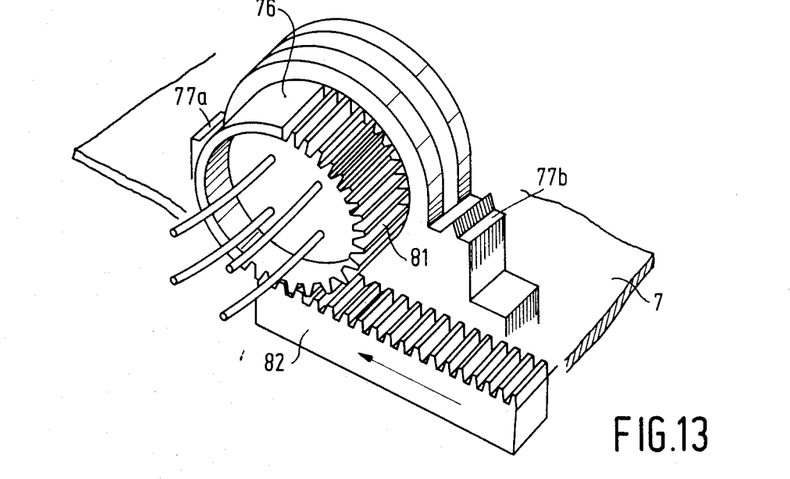
FIG. 13 a rear view of the magnetic head unit in the embodiment shown in FIG. 12.

In the embodiment shown in FIGS. 12 and 13 a head mount 76 is constructed as a cylindrical spindle. The head mount 76 is rotatably journalled relative to the head mounting plate 7 in a bearing block 77 which has two stops 77a and 77b, between which a projection 78 which is rigidly connected to the head mount 76 can rotate through 180°. A magnetic head 9 is mounted in the head mount 56 in the same way as in the first embodiment; for example the head mount 76 has an edge portion 79 which serves as a knife-edge bearing for adjustment of the magnetic head, and centering edges not shown. For adjusting the magnetic head 9 in the head mount 76 locating holes 80 are formed in the head mount 76, through which pins of an adjustment device can be passed. On the side which is remote from the head face of the magnetic head 9 the head mount is provided with teeth 81, which cover substantially 180° and which cooperate with a gear rack 82. The gear rack 82 is actuated by a actuating mechanism, not shown, of the magnetic-tape-cassette apparatus. This results in a magnet head unit which is particularly suitable for playing back both the first and the second sides of the magnetic tape cassette without the necessity to reverse the cassette 3. When the end of the magnetic tape 4 is reached, the gear rack 82 turns the magnetic head unit through 180°, so that after reversal of the transport direction of the magnetic tape the two other tracks of the magnetic tape can be recorded and/or played. This yields the advantage that by means of the magnetic head unit in accordance with the invention the height position of the tracks and the azimuth position of the tracks relative to the air gaps is defined accurately in both directions of tape transport. Since the head mount 76 and the bearing block 77 can be made of a plastic material this construction may be incorporated in a magnetic-tape-cassette apparatus in a simple cheap manner.

It will be clear to those of ordinary skill in the tape recording art that many other variations to the invention disclosed herein are possible. For example, hard metal inserts can be molded into the height limiters or control surfaces, so as to obtain a longer operating life in applications where there is extensive use of the apparatus. A plurality of magnetic head units, each having its own guides and height limiters, can be used in an apparatus having more than one head for recording or playback. The position relationship of the guide surfaces with respect to a plane tangent to the head face may be advantageously varied where the apparatus does not move the head into contact with tape in a cassette. Accordingly, it will be understood that the scope of the invention is determined by the appended claims.

I claim:
1. A magnetic tape cassette apparatus comprising:
a head mounting plate;
a magnetic head unit carried on said plate, said unit comprising a recording and/or playback magnetic head having a cylindrically curved head face in which at least one air gap terminates;
a head mount including two tape guides, arranged one to each side of the air gap in the direction of tape transport, said guides each having a cylindrically curved guide surface and a height limiter at an axial end of the guide surface, said height limiters adjoining the respective guide surfaces along a line through the two height limiters, said line being perpendicular to a plane through the air gap perpendicular to the head face at the air gap; and control means disposed at the other axial ends of the guide surfaces for guiding a lateral tape edge so as to cause the other lateral tape edge to be maintained in constant contact with the respective height limiter during tape transport; and
means for transporting a magnetic tape past said magnetic head and over said tape guides,
characterized in that said control means consist of an obliquely disposed control surface adjoining each of the respective guide surfaces arranged such that the distance from the control surface of the tape guide to the respective height limiter decreases in a direction toward the guide surface; and in that said control surfaces, guide surfaces and height limiters form an integral unit with the head mount.

2. An apparatus as claimed in claim 1, characterized in that each guide surface has a maximum axial dimension, from the height limiter to the intersection of the control surface with the guide surface, which equals the minimum width of the magnetic tape.

3. An apparatus as claimed in claim 1, characterized in that the control surface is formed by a smoothly curved convex surface, arranged such that the angle between planes tangential to the guide surface and the control surface at any location contacted by a tape edge during normal operation is between approximately 40° and 60°.

4. An apparatus as claimed in claim 1, characterized in that the head mount comprises a base portion and two side walls, said side walls being upright relative to said plate and comprising centering edges on the facing sides of the walls, said centering edges extending substantially perpendicular relative to a plane tangent to the head face at the location of the air gap and disposed at a distance from each other which is smaller than that between other portions of said side walls.

5. An apparatus as claimed in claim 4, characterized in that said base portion includes a knife edge extending inwardly toward the magnetic head, disposed midway between said side walls and extending substantially perpendicular to the plane tangent to the head face at the air gap location, said magnetic head bearing against said knife edge.

6. An apparatus as claimed in claim 5, characterized in that said head mount, guide surfaces, height limiters and control means are formed by a unitary plastic molding, and said magnetic head is retained in position within said head mount by glue.

7. An apparatus as claimed in claim 1, characterized in that the head mounting plate comprises elastic clamping means, and the head mount comprises fixing members arranged for engagement by said elastic clamping means to fix the head mount to the plate.

8. An apparatus as claimed in claim 7, characterized in that said plate includes three spaced supports, and said elastic clamping means comprises two clamping hooks; a first and a second of said supports being disposed one to each side of the head mount near said hooks, and the third support being disposed to the other side of said mount remote from the head face and the hooks; and the fixing members on the head mount comprising members having mounting edges extending substantially perpendicular to a plane tangent to the head face, said elastic hooks engaging over said mounting edges.

9. An apparatus as claimed in claim 1, characterized in that the head mount is fixed to the head mounting plate by means for rotating the head mount about an axis perpendicular to a plane tangent to the head face, through a range of rotation of 180°; and said means for rotating the head mount includes two stops for defining limits of said range of rotation.

10. An apparatus as claimed in claim 1, characterized in that the magnetic head has a wall extending substantially parallel to said plate, said wall having a wall portion disposed at a smaller distance from the head air gap than the rest of said wall; and said head mount comprises a base portion positioned at least partly against said wall portion.

11. An apparatus as claimed in claim 1, characterized in that the control surface is formed by a smoothly curved convex surface arranged such that a line of intersection of the control surface with the guide surface is located in a plane which extends substantially perpendicular to the guide surface.

12. A magnetic tape cassette apparatus comprising:
a head mounting plate;
a magnetic head unit carried on said plate, said unit comprising a recording and/or playback magnetic head having a cylindrically curved head face in which at least one air gap terminates;
a head mount including two tape guides, arranged one to each side of the air gap in the direction of tape transport, said guides each having a cylindrically curved guide surface and a height limiter at an axial end of the guide surface, said height limiters adjoining the respective guide surfaces along a line through the two height limiters, said line being perpendicular to a plane through the air gap perpendicular to the head face at the air gap; and control means disposed at the other axial ends of the guide surfaces for guiding a lateral tape edge so as to cause the other lateral tape edge to be maintained in constant contact with the respective height limiter during tape transport; and
means for transporting a magnetic tape past said magnetic head and over said tape guides,
characterized in that said head mount, guides and control means are formed by a unitary plastic molding surrounding said head on at least three sides and permanently fixed to said head,
said control means consist of an obliquely disposed control surface adjoining each of the respective guide surfaces arranged such that the distance from the control surface of the tape guide to the respective height limiter decreases in a direction toward the guide surface, and
said control surface has a configuration arranged such that a line of intersection of the control surface with the guide surface is located in a plane which extends substantially perpendicular to the guide surface.

13. An apparatus as claimed in claim 12, characterized in that each guide surface has a maximum axial dimension, from the height limiter to the intersection of the control surface with the guide surface, which equals the minimum width of the magnetic tape.

14. An apparatus as claimed in claim 12, characterized in that the control surface is formed by a smoothly curved convex surface, arranged such that the angle between planes tangential to the guide surface and the control surface at any location contacted by a tape edge during normal operation is between approximately 40° and 60°.

15. An apparatus as claimed in claim 12, characterized in that at least at the location of the tape guides, the head mount molding is covered with a wear resistant layer, thereby prolonging the corrective effect of the height limiters and control surfaces.

16. A magnetic head unit for use in a magnetic tape recording or playback apparatus, comprising a recording and/or playback magnetic head having a cylindrically curved head face in which at least one air gap terminates; a head mount within which said magnetic head is fixed; two tape guides, each tape guide having a cylindrical guide surface and a tape height limiter; said height limiters adjoining the respective guide surfaces along a line through the two height limiters, said line being perpendicular to a plane through the air gap perpendicular to the head face at the air gap; and control means for keeping a lateral edge of a tape being transported across said head face in constant contact with the height limiters,
characterized in that said control means consist of an obliquely disposed control surface adjoining each of the respective guide surfaces, arranged such that the distance from the control surface of the tape guide to the respective height limiter decreases in a direction toward the guide surface; said control surface has a configuration arranged such that a line of intersection of the control surface with the guide surface is located in a plane which extends substantially perpendicular to the guide surface; and in that said control surface, guide surfaces and height limiters form an 17. A unit as claimed in claim 16, characterized in that said head mount is molded from a plastic material and, at least at the location of the tape guides, is covered with a wear-resistant layer.

18. A unit as claimed in claim 17, characterized in that, viewed perpendicularly to a plane tangent to the head face at the location of the air gap, the head mount surrounds the magnetic head on four sides.

19. A unit as claimed in claim 16, characterized in that said guide surfaces are cylindrical about axes which are arranged at a small acute angle with respect to a plane tangent to the head face at the air gap, such that a magnetic tape being transported past the air gap is biased by said angle against the height limiters.

20. A unit as claimed in claim 19, characterized in that said acute angle is between approximately 2° and 3°.

21. A unit as claimed in claim 16, characterized in that the head mount comprises a base portion and two side walls, said side walls being upright relative to said plate and comprising centering edges on the facing sides of the walls, said centering edges extending substantially perpendicular relative to a plane tangent to the head face at the location of the air gap and disposed at a distance from each other which is smaller than that between other portions of said side walls.

22. A unit as claimed in claim 16, characterized in that said base portion includes a knife edge extending inwardly toward the magnetic head, disposed midway between said side walls and extending substantially perpendicular to the plane tangent to the head face at the air gap location, said magnetic head bearing against said knife edge.

* * * * *

UNITED STATES PATENT AND TRADEMARK OFFICE
CERTIFICATE OF CORRECTION

PATENT NO. : 4,926,278

DATED : May 15, 1990

INVENTOR(S) : JOHANNES J.M. SCHOENMAKERS

It is certified that error appears in the above-identified patent and that said Letters Patent is hereby corrected as shown below:

Claim 16
  (Col 13, line 4)         after "form an" insert --integral unit with the head mount.--;

Claim 22, line 1         change "claim 16" to --claim 21--.

Signed and Sealed this

Second Day of July, 1991

Attest:

HARRY F. MANBECK, JR.

*Attesting Officer*          *Commissioner of Patents and Trademarks*